US008652385B2

(12) United States Patent
Lam et al.

(10) Patent No.: US 8,652,385 B2
(45) Date of Patent: Feb. 18, 2014

(54) METHOD OF MANUFACTURING A DECORATIVE ARTICLE WITH SEALED DECORATIVE LAMINATED SHEET

(75) Inventors: Yin Sang Lam, Hong Kong (HK); Yan Hui Zou, Guangdong (CN); Yan Zhang, Hong Kong (CN)

(73) Assignee: Okia Optical Company Ltd., Kowloon (HK)

( * ) Notice: Subject to any disclaimer, the term of this patent is extended or adjusted under 35 U.S.C. 154(b) by 619 days.

(21) Appl. No.: 12/349,010

(22) Filed: Jan. 6, 2009

(65) Prior Publication Data

US 2009/0174860 A1    Jul. 9, 2009

Related U.S. Application Data

(63) Continuation-in-part of application No. 11/734,903, filed on Apr. 13, 2007.

(60) Provisional application No. 60/824,782, filed on Sep. 7, 2006.

(51) Int. Cl.
| *B29C 45/00* | (2006.01) |
| *B29C 53/00* | (2006.01) |
| *B29C 51/00* | (2006.01) |
| *G02C 11/02* | (2006.01) |

(52) U.S. Cl.
USPC ..... 264/279.1; 264/294; 264/299; 264/328.1; 264/339; 351/51

(58) Field of Classification Search
None
See application file for complete search history.

(56) References Cited

U.S. PATENT DOCUMENTS

| 3,104,425 A * | 9/1963 | Crane et al. ............... 249/67 |
| 3,592,725 A | 7/1971 | Yoshimura et al. |
| 3,753,825 A | 8/1973 | Stock |
| 4,665,598 A | 5/1987 | Murai et al. |
| 4,690,523 A | 9/1987 | Loiacono |
| 5,923,395 A | 7/1999 | Yamaguchi et al. |
| 6,808,804 B2 | 10/2004 | Hotaka et al. |
| 2007/0026197 A1 * | 2/2007 | Suga et al. ............... 428/172 |

FOREIGN PATENT DOCUMENTS

| CN | 2444789 Y | 8/2001 |
| DE | 3935397 | 4/1991 |
| GB | 0908873 | 10/1962 |
| GB | 1388680 | 3/1975 |
| JP | 6226920 | 8/1994 |
| JP | 6234191 | 8/1994 |
| JP | 09291682 A2 | 11/1997 |
| JP | 2002293094 A * | 10/2002 |
| JP | 2004-338246 | 12/2004 |
| WO | WO 2005030481 A1 * | 4/2005 |

OTHER PUBLICATIONS

Machine Translation of JP 2002-293094 A, Jul. 11, 2013.*

* cited by examiner

*Primary Examiner* — Benjamin Schiffman
(74) *Attorney, Agent, or Firm* — Ella Cheong Hong Kong; Sam T. Yip

(57) ABSTRACT

An eyeglass frame including a thermoplastic sheet laminate incorporating transfer printing eyeglass decorative patterns and a one or more covering layers bonded thereto. A process for manufacturing an eyeglass frame including: preparing a thermoplastic sheet laminate incorporating eyeglass decorative patterns; bending said thermoplastic sheet laminate under heat and pressure forming a one or more intermediate products in a first mold; and bonding a one or more covering layers to the intermediate products from the bending step in a second mold.

6 Claims, 2 Drawing Sheets

Figure 2
210 Prepare a thermoplastic sheet laminate incorporating eyeglass decorative pattern or patterns.
220 Bend the thermoplastic sheet laminate incorporating eyeglass decorative patterns under heat and pressure in a first mold to form an intermediate product.
230 Bond the covering layers to the intermediate products from step 220 in a second mold.

METHOD OF MANUFACTURING A DECORATIVE ARTICLE WITH SEALED DECORATIVE LAMINATED SHEET

CROSS-REFERENCE TO RELATED APPLICATIONS

The present filed application is a continuation in part claiming priority to U.S. patent application Ser. No. 11/734,903 filed Apr. 13, 2007, which claims priority to U.S. Provisional Patent Application Ser. No. 60/824,782 filed Sep. 7, 2006, both of which are herein incorporated by reference in their entireties.

TECHNICAL FIELD

The invention relates generally to eyeglass frames with decorative patterns and a related method for preparing the same. More specifically, the invention relates to a protective coating for eyeglass frames.

BACKGROUND OF THE INVENTION

Eyeglass designers have been making continuous efforts in designing a great variety of eyeglasses to satisfy consumers' needs and tastes. Eyeglasses can alleviate eye defects such as myopia, hyperopia or astigmatism, or protect the eyes against bright daylight and ultraviolet light from the sun, and hence have become an essential product in daily life. Being worn on the face, it is often desirable that the design of eyeglasses are aesthetically pleasing. Eyeglasses also serve as a fashion accessory and even form part of the identity of some celebrities. The ornamentation of eyeglasses are available in a wide range of styles, materials, premium designs, and further decorated with a selection of colors and patterns in the frames, including temples, eyeglass fronts, rims and bridges, to meet the preference of different consumers.

Conventionally, the decorative designs are two dimensional patterns or graphics. To produce eyeglass frames with decorative patterns, such patterns are usually transferred on to the surface materials, and further coated with a protective plastic layer. Because the protective layer can be worn out after prolonged use, ultimately the transferred patterns will also be depleted.

Accordingly, laminate material for eyeglass frames were developed and manufactured by the following known method in which a first plastic sheet is first pasted with a glue layer, which is then printed with desired patterns by silk screen printing. The intermediate laminate is pasted with another glue layer and glued to a second plastic sheet, and subsequently adhered together by hot compression. The resulting laminate has decorative patterns embedded between the two plastic sheets and is difficult to wear out during use. However, the relevant configuration and manufacturing process of such a laminate is complex, and has a lengthy production cycle. Further, a different silk screen is required if a different pattern is to be printed, resulting in low productivity and high manufacturing cost.

Cellulose Acetate is one of the most common thermoplastic materials used in making eyewear. It allows patterns to be transferred on thermoplastic sheets and overcomes the limitation for injection plastics.

In conventional technologies, eyeglass thermoplastic sheeting has to be coated with a glue layer, and then printed with patterns by silk screen printing. When the ink dries up, another glue layer will be coated and adhered to a second plastic sheet by compression or thermal process. These techniques however are costly and time consuming, especially for producing polychrome patterns.

Silk screen printing requires one mask for each monochrome and only one monochrome can be printed at each time. In addition, to manufacture products with different patterns, a different set of silk screens is required. It also takes a long time to verify the silk screen pattern and the effect on sheet material, resulting in an extended production cycle. Furthermore, the pattern cannot be very fine because the ink is applied to the back of the image carrier and pushed through porous or open areas.

The conventional method is also limited to producing two dimensional patterns or graphics.

A thermoplastic laminate printed with internal decorative patterns for eyeglass frames and its manufacturing process has been disclosed in patent publication nos. WO2007/128196 and U.S. Ser. No. 11/734,903. However, the referenced manufacturing process is, due to the complexity, done manually, thus resulting in a lengthy production cycle. Furthermore, the stability of the eyewear is limited and the uniformity as well as the dimension of the eyewear cannot be easily controlled based on such manufacturing process, resulting in low productivity and high manufacturing cost with poor aesthetic. A further consequence of the poor stability is that internal stresses may be set up in the frame, which are self relieved over time. As the frame relaxes naturally this can cause the lens to deform affecting its corrective power.

Consequently, there is a need to produce eyewear with good stability and with high density and durable decorative patterns. There is also a need to improve the current manufacturing process to produce eyewear with a good uniformity in profile and dimensions.

BRIEF SUMMARY OF THE INVENTION

A first aspect of the presently claimed invention is to provide an eyeglass frame containing a thermoplastic sheet laminate incorporating one or more transfer printing eyeglass decorative patterns and a one or more covering layers; wherein the covering layers bond to the thermoplastic sheet laminate incorporating transfer printing eyeglass decorative patterns.

The thermoplastic sheet laminate incorporating transfer printing eyeglass decorative patterns preferably comprises: a plurality of core layers of thermoplastic sheets printed with patterns by transfer printing, a first overlay layer of thermoplastic sheet; a second overlay layer of thermoplastic sheet; wherein said core layers are sandwiched between said first overlay layer and said second overlay layer.

The core layers may further partially or wholly enclose particles or three dimensional articles. The three dimensional articles enclosed in the core layers may be dry flowers, rhinestones, dry leaves or metal foil logos. The core layers may further enclose at least one kind of fluid, said fluids being immiscible with each other. The fluid enclosed in core layers may be colored or clear water, oil based fluid, or liquid silicone. The transfer printing may be heat pressing transfer, water transfer, vapor transfer, screen printing, or stencil printing. The thermoplastic may be cellulose acetate, cellulose acetate propionate, polycarbonate, thermoplastic elastomer, nylon, polyester or polyester copolymer. The core layers and overlay layers may be adhered together by application of an adhesive substance, application of heat, or application of pressure. The core layers and overlay layers may be bonded together by thermoform or lamination. The patterns printed on core layers may be monochromatic or polychromatic.

The process of manufacturing the thermoplastic sheet laminate incorporating transfer printing eyeglass decorative patterns comprises the steps of: a) preparing a plurality of core layers, a first overlay layer and a second overlay layer from thermoplastic sheets, b) printing patterns on said core layers by transfer printing, c) layering from top to bottom said first overlay layer, said core layers and said second overlay layer, and d) bonding the layer of sheets from step (c).

The bonding step may be the application of adhesive substance, application of heat, or application of pressure. The bonding step may be the step of thermoform or lamination. The bonding step may comprise the step of applying a temperature in the range of 0 to 300 degrees Celsius and a pressure starting from 0 atmospheres. The process may further comprise the step of laying particles on core layers before bonding said composite layer of sheets.

The process of manufacturing the thermoplastic sheet laminate incorporating transfer printing eyeglass decorative patterns may further comprise the steps of: a) making cavities in said core layers before applying heat to said composite layer of sheets to enclose three dimensional articles or fluids, and b) positioning or filling said articles or fluids in said cavities. The thermoplastic may be cellulose acetate, cellulose acetate propionate, polycarbonate, TPE or nylon. The transfer printing may be heat pressing transfer, water transfer, vapor transfer, screen printing, or stencil printing. The heat pressing transfer may be a process of temperature in the range of 0 to 300 degrees Celsius. The three dimensional articles enclosed in core layers may be dry flowers, rhinestones, dry leaves or metal foil logo. The fluid enclosed in core layers may be colored or clear water, oil based fluid or liquid silicone. Other fluids, articles or combinations of such may be used.

The or each covering layer acts as a protective layer for the thermoplastic sheet laminate incorporating transfer printing eyeglass decorative patterns. These covering layers may bond to a first side ("the top") and to a second side ("the bottom") of the thermoplastic sheet laminate incorporating transfer printing eyeglass decorative patterns. Alternatively the covering layers may bond to one of the two sides only. The covering layer may wholly substantially or partially cover the thermoplastic sheet laminate incorporating transfer printing eyeglass decorative patterns. Preferably the internal layer comprising the thermoplastic sheet laminate where the first side or second side of the thermoplastic sheet laminate incorporating the decorative patterns and the edges thereof are wholly sealed within the covering layers. The covering layers used are made of thermoplastic or thermosetting plastic and they may be any of transparent, semi-transparent or non-transparent, either in whole or in part. The thermoplastic materials may be any of cellulose acetate, cellulose acetate propionate, polycarbonate, thermoplastic elastomer, nylon, polyester or polyester copolymer. The thermosetting materials may be epoxy or polyurethane.

The second aspect of the present invention is to provide a manufacturing process for eyeglass frames. The process comprises the steps of: a) preparing a thermoplastic sheet laminate incorporating eyeglass decorative patterns; b) bending the thermoplastic sheet laminate incorporating eyeglass decorative patterns under heat and pressure forming a one or more intermediate products in a first mold; c) bonding a one or more covering layers to the intermediate products from step b in a second mold. The bending step is carried out at a temperature between 40 to 250 degrees Celsius, selected according to the materials. Preferably it is 30 to 60 degrees Celsius. The process of the bonding step may be by injection molding or casting. The bonding step may involve heating the eyeglass at a temperature in the range of 0 to 300 degrees Celsius. The bonding step may optionally or alternatively involve applying pressure. The covering layers may also be applied to already suitably prepared new or suitably cleaned old frames.

BRIEF DESCRIPTION OF THE SEVERAL VIEWS OF THE DRAWINGS

One or more embodiments are now described with reference to the drawings, in which:

FIG. 2 is a flow chart of the manufacturing process of eyeglass frames.

DETAILED DESCRIPTION OF THE INVENTION

Figure 1:
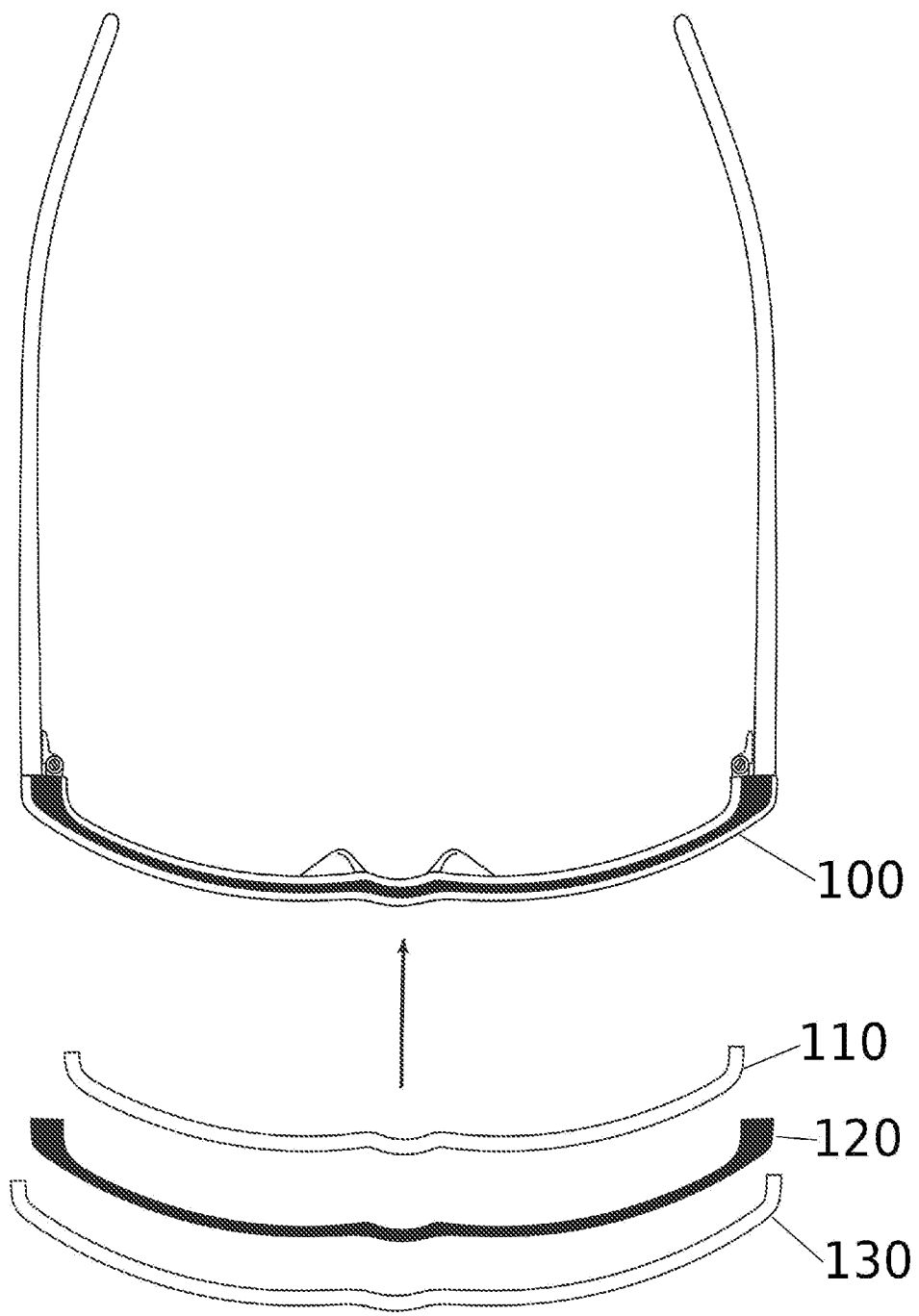
FIG. 1 is a top down view of an eyeglass containing a thermoplastic sheet laminate incorporating transfer printing eyeglass decorative patterns and one or more covering layers.

Where reference is made in any one or more of the accompanying drawings to steps and/or features, which have the same reference numerals, those steps and/or features have for the purposes of this description the same function(s) or operation(s), unless the contrary intention appears.

The preferred method described herein provides eyeglass frames with thermoplastic sheet laminate incorporating transfer printing decorative patterns and covering layers, which will not be affected by external conditions during use, and provides further advantages of both reducing the costs by saving materials during the manufacturing process and producing eyeglass frames with a good uniformity in profile and dimensions during mass production.

An eyeglass frame includes thermoplastic sheet laminate incorporating transfer printing eyeglass decorative patterns and a one or more covering layers; wherein the covering layers bond to the thermoplastic sheet laminate incorporating transfer printing eyeglass decorative patterns. The thermoplastic sheet laminate incorporating transfer printing eyeglass decorative patterns (hereafter referred to as "the thermoplastic sheet laminate") comprises a plurality of core layers of thermoplastic sheets printed with patterns by transfer printing, a first overlay layer of thermoplastic sheet; a second overlay layer of thermoplastic sheet; wherein said core layers are sandwiched between said first overlay layer and said second overlay layer.

The covering layers are made of plastic which are the protective layers for the thermoplastic sheet laminate.

FIG. 1 displays eyeglasses containing the thermoplastic sheet laminate and a one or more covering layers. The eyeglass frame 100 comprises thermoplastic sheet laminate 120, a first covering layer 110 and a second covering layer 130. In the shown embodiment, a first covering layer 110 bonds to the top of the thermoplastic sheet laminate 120 and a second covering layer bonds 130 to the bottom of the thermoplastic sheet laminate 120. The laminate is shown shaded for clarity, but the layers may or may not be visible to the naked eye. The thickness of the layers may also vary from that shown. In another embodiment (not shown), a first covering layer 110 bonds to the top of the thermoplastic sheet laminate 120. In yet another embodiment (not shown), a second covering layer bonds 130 to the bottom of the thermoplastic sheet laminate 120. The adhesion of the thermoplastic sheet laminate and the first and/or second covering layers can be accomplished by injection molding or casting.

FIG. 2 displays the steps in the manufacturing process of eyeglass frames containing thermoplastic sheet laminate and covering layers. A flat thermoplastic sheet laminate incorporating eyeglass decorative patterns is prepared in step 210 and is optionally cut to the shape and dimensions of desired eyewear. The flat thermoplastic sheet laminate incorporating eyeglass decorative patterns is placed in a first mold and bent under heat and pressure above 0 atmosphere in a bending step 220, thus forming a one or more intermediate products having the design curvature. Next, in a bonding step 230, the formed intermediate products are bonded to one or more covering layers in a second mold by injecting the material of the covering layers into said second mold.

In the bending step heat and pressure are applied. The bending step is carried out at a temperature between 30 to 60 degrees Celsius. The applied pressure should be substantially 0.2 kgf/cm$^2$.

Next, in one embodiment, the bent intermediate product is first put into a injection mold where plastic materials are injected under the application of heat and pressure to form the first and/or second covering layers. The temperature and the pressure of the injection molding process depend on the plastic materials of covering layer. The material of covering layer is a thermal plastic such as cellulose acetate.

In another embodiment, the bent intermediate product is next put into a casting mold where plastic materials are injected under the application of pressure. A period of time after injection molding, the whole casting mold is put into an oven at a certain temperature to cure. The oven time varies depending on the dimensions of the frames, with the casting mould being put in the oven typically for around 30 seconds after injection. During curing the injected plastic materials solidify to form the first and/or second covering layers. The temperature of the curing process is selected based on the materials of covering layer.

The foregoing describes only some embodiments of the present invention, and modifications and/or changes can be made thereto without departing from the scope and spirit of the invention, the embodiments being illustrative and not restrictive.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for manufacturing an article of manufacture comprising:
   a. a preparing step of preparing a thermoplastic sheet laminate incorporating decorative patterns formed by transfer printing or by enclosing three-dimensional articles or fluids in the thermoplastic sheet laminate;
   b. a bending step where said thermoplastic sheet laminate is bent under heat at 30 to 60 degrees Celsius forming one or more intermediate products in a first mold; and
   c. a bonding step where one or more covering layers are bonded to the one or more intermediate products from said bending step in a second mold such that the covering layers wholly seal the one or more intermediate products by injection molding or by casting.

2. The process for manufacturing an article according to claim 1, wherein said bending step further comprises applying pressure.

3. The process for manufacturing an article according to claim 1, wherein said bonding step further comprising heating and pressurizing the one or more intermediate products at a temperature in the range of 0 to 300 degrees Celsius and a pressure greater than 0 atmospheres.

4. The process for manufacturing an article according to claim 1, wherein said one or more covering layers is selected from the group consisting of cellulose acetate, cellulose acetate propionate, polycarbonate, thermoplastic elastomer, nylon, polyester, and polyester copolymer.

5. The process for manufacturing an article according to claim 1, wherein said one or more covering layers is selected from the group consisting of epoxy and polyurethane.

6. The process for manufacturing an article according to claim 1 wherein said one or more intermediate products is formed in the shape of an eyeglass frame.

* * * * *